United States Patent
Grobman et al.

(10) Patent No.: US 10,678,908 B2
(45) Date of Patent: Jun. 9, 2020

(54) TRUSTED EXECUTION OF AN EXECUTABLE OBJECT ON A LOCAL DEVICE

(71) Applicant: McAfee, LLC, Santa Clara, CA (US)

(72) Inventors: Steve Grobman, El Dorado Hills, CA (US); Carl Woodward, Santa Clara, CA (US); James D. Beaney, Jr., Raleigh, NC (US); Jimmy Scott Raynor, Irmo, SC (US)

(73) Assignee: McAfee, LLC, Santa Clara, CA (US)

( * ) Notice: Subject to any disclaimer, the term of this patent is extended or adjusted under 35 U.S.C. 154(b) by 0 days.

(21) Appl. No.: 14/913,805

(22) PCT Filed: Dec. 21, 2013

(86) PCT No.: PCT/US2013/077336
§ 371 (c)(1),
(2) Date: Feb. 23, 2016

(87) PCT Pub. No.: WO2015/047442
PCT Pub. Date: Apr. 2, 2015

(65) Prior Publication Data
US 2017/0039368 A1    Feb. 9, 2017

Related U.S. Application Data

(60) Provisional application No. 61/883,970, filed on Sep. 27, 2013.

(51) Int. Cl.
*G06F 21/53* (2013.01)
*G06F 21/31* (2013.01)
(Continued)

(52) U.S. Cl.
CPC .............. *G06F 21/53* (2013.01); *G06F 21/31* (2013.01); *G06F 21/32* (2013.01); *G06F 21/74* (2013.01);
(Continued)

(58) Field of Classification Search
CPC ............................. G06F 21/32; H04L 63/0861
See application file for complete search history.

(56) References Cited

U.S. PATENT DOCUMENTS

| 5,987,610 A | 11/1999 | Franczek et al. |
| 6,073,142 A | 6/2000 | Geiger et al. |

(Continued)

FOREIGN PATENT DOCUMENTS

| CN | 102819700 A | 12/2012 |
| EP | 2192547 A1 | 6/2010 |

(Continued)

OTHER PUBLICATIONS

GlobalPlatform, GlobalPlatform Device Technology TEE Internal API Specification Version 1.0, Dec. 2011, 202 Pages.*

(Continued)

*Primary Examiner* — Christopher C Harris
(74) *Attorney, Agent, or Firm* — Patent Capital Group

(57) ABSTRACT

In one example embodiment, an electronic device is provided and configured to: acquire authentication data for an authorized user; store the authentication data in an enclave; acquire identification data for a potential user; and compare, in the enclave, the identification data to the authentication data for recognizing if the potential user is the authorized user. In another embodiment, a server is provided and includes at least one processor; at least one memory; at least one driver, where the server is configured to: receive assertion data from an electronic device, where the assertion includes an authentication signing key and results from a (Continued)

comparison of acquired data and reference data; and determine if the assertion data is valid by: comparing the results to a threshold; and comparing the authentication signing key to an authentication signing key assigned to the electronic device.

17 Claims, 10 Drawing Sheets

(51) Int. Cl.
  *G06F 21/74*  (2013.01)
  *H04L 29/06*  (2006.01)
  *H04W 12/06*  (2009.01)
  *H04W 12/00*  (2009.01)
  *G06F 21/32*  (2013.01)

(52) U.S. Cl.
  CPC ...... *H04L 63/0861* (2013.01); *H04L 63/0884* (2013.01); *H04W 12/0027* (2019.01); *H04W 12/06* (2013.01); *G06F 2221/2105* (2013.01)

(56) References Cited

U.S. PATENT DOCUMENTS

| | | | |
|---|---|---|---|
| 6,460,050 B1 | 10/2002 | Pace et al. | |
| 7,506,155 B1 | 3/2009 | Stewart et al. | |
| 2004/0236954 A1 | 11/2004 | Vogt et al. | |
| 2012/0137137 A1* | 5/2012 | Brickell | G06F 21/73 713/182 |
| 2012/0167188 A1* | 6/2012 | Poornachandran | H04L 63/0853 726/7 |
| 2012/0181333 A1 | 7/2012 | Krawczewicz et al. | |
| 2013/0167204 A1 | 6/2013 | Gregg et al. | |
| 2013/0219481 A1* | 8/2013 | Voltz | H04L 63/20 726/9 |
| 2014/0068740 A1* | 3/2014 | LeCun | H04L 63/0861 726/7 |
| 2014/0109187 A1* | 4/2014 | Rados | G06F 21/57 726/4 |
| 2014/0173709 A1* | 6/2014 | Eldar | H04L 9/3226 726/7 |
| 2014/0195815 A1* | 7/2014 | Taveau | G06F 21/32 713/186 |
| 2014/0258736 A1* | 9/2014 | Merchan | G06F 21/62 713/193 |
| 2014/0259125 A1* | 9/2014 | Smith | G06F 21/32 726/5 |
| 2014/0289833 A1* | 9/2014 | Briceno | H04L 63/08 726/7 |
| 2014/0298412 A1* | 10/2014 | Buer | H04L 9/3271 726/2 |
| 2014/0310510 A1* | 10/2014 | Potlapally | G06F 9/4401 713/2 |
| 2016/0241552 A1* | 8/2016 | Lindemann | G06F 21/32 |

FOREIGN PATENT DOCUMENTS

| | | |
|---|---|---|
| WO | WO 2013-134832 A1 | 9/2013 |
| WO | WO 2015/047442 A1 | 4/2015 |

OTHER PUBLICATIONS

Bechtholt, Encryption: Five Major Benefits, Mar. 19, 2013, Kaspersky, 1 Page.*

Wiley, The essential client/server survival guide, 1996, 2nd Edition, p. 11 (Year: 1996).*

International Search Report and Written Opinion in International Application No. PCT/US2013/077336, dated Jun. 23, 2014, 11 pages.

CN Feb. 6, 2018 First Office Action from Chinese Application Serial No. 201380079574.6; 14 pages w/English translation.

* cited by examiner

TRUSTED EXECUTION OF AN EXECUTABLE OBJECT ON A LOCAL DEVICE

CROSS-REFERENCE TO RELATED APPLICATION

This Application is a National Stage application under 35 U.S.C. 371 of International Application PCT/US13/77336 filed on Dec. 21, 2013 and entitled TRUSTED EXECUTION OF AN EXECUTABLE OBJECT ON A LOCAL DEVICE, which claims priority to U.S. Provisional Patent Application Ser. No. 61/883,970, filed on Sep. 27, 2013 and entitled TRUSTED EXECUTION ON A LOCAL DEVICE. The disclosures of the prior applications are considered part of and are incorporated by reference in the disclosure of this application.

FIELD OF THE DISCLOSURE

This application relates to the field of computer network security and, more particularly, to a system, an apparatus, and a method for trusted execution of an executable object on a local device.

BACKGROUND

As used throughout this specification, malicious software ("malware") can include any virus, Trojan, bot, zombie, rootkit, backdoor, worm, spyware, adware, ransomware, dialer, payload, malicious browser helper object, cookie, logger, or similar designed to take a potentially-unwanted action, including by way of non-limiting example system hijacking, impersonation of an authorized user, unauthorized access to a system, data destruction, covert data collection, browser hijacking, network proxy or redirection, covert tracking, data logging, keylogging, excessive or deliberate barriers to removal, contact harvesting, and unauthorized self-propagation.

Apart from being developed to operate as standalone programs, malware may also take a form of malicious code added or injected into other software. One example of this form may be an "infected file" where malicious code is introduced by a parasitic replicating computer virus. Malicious code can also be injected manually or it can be added to the sources of software so that after compilation it will become part of the executable object, or can be added to scripts and interpreted, which may or may not be compiled.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION OF THE EMBODIMENTS

Overview

Figure 1:
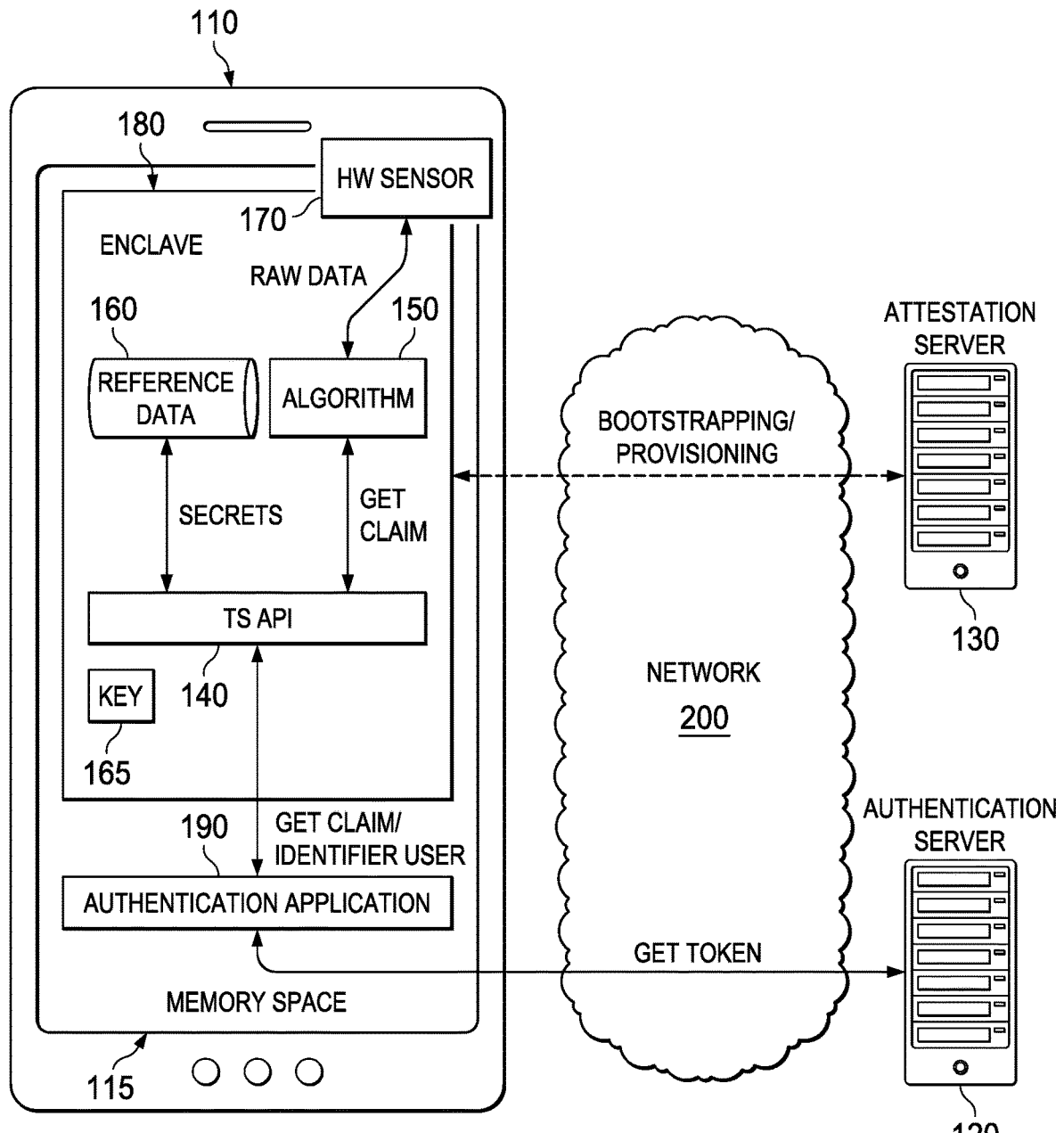
FIG. 1 is a block diagram of an environment for trusted execution of an executable object on an electronic device according to one or more examples of the present specification.

In an example, there is disclosed a system, an apparatus, and a method for locally executing sensitive code from any suitable service (e.g., a cloud service) on a local device via a secured trusted environment. In one example embodiment, an electronic device is provided and includes at least one processor; at least one memory; and at least one driver, where the electronic device is configured to: acquire authentication data for an authorized user; store the authentication data in an enclave; acquire identification data for a potential user; and compare, in the enclave, the identification data to the authentication data for recognizing if the potential user is the authorized user. In a broad sense, the term 'acquire' includes any activity associated with accessing, receiving, securing, learning of, retrieving, or otherwise obtaining data. In addition, the term 'recognizing' is meant to include any activity associated with evaluating, validating, verifying, correlating, distinguishing, understanding, or otherwise identifying one or more attributes, characteristics, or features of a given user.

In another embodiment, a server is provided and includes at least one processor; at least one memory; at least one driver, where the server is configured to: receive assertion data from an electronic device, where the assertion includes an authentication signing key and results from a comparison of acquired data and reference data; and determine if the assertion data is valid by: comparing the results to a threshold; and comparing the authentication signing key to an authentication signing key assigned to the electronic device.

Example Embodiments of the Disclosure

Cloud computing is a concept used to describe a variety of computing concepts that involve a large number of computers connected through a real-time communication network such as the Internet. Cloud computing relies on sharing of resources to achieve coherence and economies of scale, similar to a utility (like the electricity grid) over a network. At the foundation of cloud computing is the broader concept of converged infrastructure and shared services. The cloud also focuses on maximizing the effectiveness of the shared resources. Today's cloud computing systems handle increasing amounts of important, sensitive, and valuable information. This information should be protected from malware and theft.

Currently, the problem of protecting devices and applications from malware and theft is typically addressed using two different methods. In one method, sensitive processing is performed locally. For example, this may make use of best practices for operating system access control (including running sensitive code in privileged execution modes). Local sandboxes and application/hardware virtualization techniques may control accesses to processes, threads, and operating system objects. However, local security techniques are generally ineffective against advanced persistent threats, man in the application attacks, and virtualization or hardware-based attacks.

In the second method, sensitive processing is performed in the cloud. For example, hypertext transfer protocol secure (HTTPS)/secure socket layer (SSL) and similar protocols may be used to prevent in-flight secret theft. In addition, signing digital signatures may be used to prevent impersonation and tampering. One-time passwords may also be used. In addition, dual-factor authentication techniques are sometimes used to mitigate reply attacks. However, these approaches are sub-optimal as cloud-based processing is overly complex (especially when the processing could performed locally), may require a connection to a network, and can be subject to network variables such as latency. In addition, the connection may be costly for the service provider as they pay for computer processing unit (CPU), memory, and bandwidth usage, and can be subject to man in the middle and denial of service network attacks. What is needed is a system and method that allows cloud-based services to be securely executed locally without sacrificing performance, cost, or security. It would be beneficial if the system and method utilized a trusted environment to replace cloud-based services instead of focusing on securing cloud-based communications or relying on inadequate operating system (OS) access controls, bespoke sandboxes, or virtualization techniques.

The foregoing is offered by way of non-limiting examples in which the system and method of the present specification may usefully be deployed. The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiment many have different advantages, and no particular advantage is necessarily required of any embodiment.

In the examples of the present specification, a system and method is provided for trusted execution of an application or process on a local device that allows sensitive operations (such as biometric authentication) to be executed locally on a user's electronic device in a trusted secure environment-without sacrificing performance, cost and security.

In one example, an enclave may be used to reduce overall complexity, latency, and cloud costs (e.g., CPU, memory, bandwidth, etc.). The term "enclave" is inclusive of a trusted execution environment (TEE) and is a protected region of memory that is only accessible by the enclave itself or through a trusted services application program interface. Other processes cannot read, write, or otherwise access the data stored in the enclave. The system can reduce gaps and unknowns from local protection mechanisms including hardware-based attacks because the system can be configured to allow for the collection and processing of data without external communication to other processes on an electronic or local device, or cloud-based service. Such a process can significantly reduce the attack surface of the system and allow for a more secure environment.

The system and method can make use of the enclave and protect the acquisition of data from hardware sensors, analysis of the data (e.g., identify a user via biometric algorithms) and transmission of the results to a third-party server over an encrypted and integrity checked communication channel (e.g., claim-based authentication or OAUTH). In addition, algorithms may execute in a known secure environment where the system can assert that the algorithms and runtime data in use by the system cannot be inspected, tampered with, or otherwise maliciously modified, even if malware is already running on the device. Persistent data may be encrypted by the enclave and then be securely stored on any file system, including an untrusted file system. Allowing the user to perform a sensitive operation (e.g., authenticate to a web service) even if the electronic device has been compromised can provide significant benefits. In so doing, the system may reduce overall complexity, eliminate unnecessary cloud components, reduce the overall attack surface of the system, and allow the user to make use of the system even when part of the system has been compromised.

According to one or more non-limiting example embodiments of the present specification, the system and method disclosed operates by moving algorithms and data for sensitive operations from the cloud into the enclave. This allows algorithms and data (both runtime and persistent) to be protected from attackers. In addition, operations can execute at full local speed without a network connection and are not subject to latency, man in the middle attacks and network orientated denial of service attacks. Further, the service provider does not incur cloud CPU, memory, and bandwidth usage costs.

In an example, two broad phases are provided: bootstrapping and normal operation. In the bootstrapping phase, the enclave is "provisioned." During provisioning, an attestation server determines if an electronic device has trusted execution capability, and if so, shares data and an authentication signing key with an enclave on the electronic device. The authentication and signing key is used for secure communications between the enclave and an authentication server during the normal phase. In the normal phase, algorithms run inside the enclave in a safe and secure environment. The electronic device can be configured to execute the algorithms by calling a set of predefined edge functions that allow entry into the enclave. The results from the algorithms are sent to the authentication server with the authentication signing key to verify the authenticity and validity of the results.

The following is an illustration of an example use case of moving biometric cloud based processing to an electronic device using an enclave according to one or more example embodiments of the present specification. It should be noted that the trusted execution techniques disclosed here are given as non-limiting examples only, and it is intended that any suitable technique for trusted execution of executable objects or access to data should be included in the broad scope of this specification.

During provisioning, the attestation server confirms that an un-trusted electronic device has an enclave or TEE capability. On successful confirmation, the attestation server shares reference data and a one-time pad or authentication signing key with the electronic device using a public-key infrastructure (PKI). In an example, the authentication signing key is asymmetric. The shared data from the attestation server is stored by the enclave using hardware storage features or encrypted and stored on an un-trusted file system. An authentication application can request the enclave to gather biometric data from hardware sensors or, if hardware sensors cannot be accessed from and/or operate within the enclave, deliver raw biometric data to the enclave using a trusted services application program interface (API). The enclave can processes the biometric data and build assertion data describing the confidence that the raw biometric data identifies a known user (i.e., an electronic device) and that the authentication attempt is live (i.e. not replayed video or photograph).

The assertion data (i.e., the message) can be signed (and potentially encrypted) by the enclave using the authentication signing key shared during provisioning/attestation. Once signed (and in some examples encrypted), the assertion data can then be returned to the authorization application and sent to an authentication server. The authentication server can assert that the claim has not been tampered with by verifying the authentication signing key (to maliciously modify the assertion, an attacker would need to change the assertion and resign the assertion with the authentication signing key, which is only accessible within the enclave). The authentication server can return a signed token to the authorization application with a key known to the enclave. The authorization application can verify the integrity of the token and that the token has not been tampered with by using a trusted services API call to the enclave.

FIG. 1 is a block diagram of an environment for trusted execution of an executable object on a local device according to one or more examples of the present specification. In this example, the environment can include an electronic device 110, an authentication server 120, and an attestation server 130. Electronic device 110, authentication server 120, and attestation server 130 may communicate through network 200 (e.g., using any suitable wireless or wired protocol).

Network 200 represents a series of points or nodes of interconnected communication paths for receiving and transmitting packets of information. Network 200 offers a communicative interface between electronic device 110, authentication server 120, and attestation server 130, may be any local area network (LAN), wireless local area network (WLAN), metropolitan area network (MAN), wide area network (WAN), virtual private network (VPN), Intranet, Extranet, or any other appropriate architecture or system that facilitates network communications in a network environment. Network communications, which can be inclusive of packets, frames, signals, data, etc., can be sent and received according to any suitable communication messaging protocols. Suitable communication messaging protocols can include a multi-layered scheme such as open systems interconnection (OSI) model, or any derivations or variants thereof (e.g., transmission control protocol/Internet protocol (TCP/IP), user datagram protocol/IP (UDP/IP)). The term 'data' as used herein, refers to any type of binary, numeric, voice, video, textual, or script data, or any type of source or object code, or any other suitable information in any appropriate format that may be communicated from one point to another in computing devices (e.g., electronic devices) and/or networks.

Authentication server 120 may be a server or other device that can verify that an assertion from electronic device 110 has not been tampered with by verifying the authentication signing key. The authentication server 120 can return a signed token to electronic device 110 with a key known to enclave 180 to verify the authenticity of the integrity of the assertion. Attestation server 130 may be a server or other device that determines if electronic device 110 has a trusted environment for trusted execution capability (e.g., an enclave or TEE). If so, attestation server 130 can share data and authentication signing key material with enclave 180, which are used for secure communications between enclave 180 and authentication server 120.

The term "server" is inclusive of any device used to serve the requests of clients and/or perform some computational task on behalf of clients. Authentication server 120 and attestation server 130 can be associated with clients, customers, endpoints, or end users wishing to initiate a communication via some network (e.g., network 200). Authentication server 120 and attestation server 130 may be virtual servers, non-virtualized servers, or any device that seeks to initiate a communication on behalf of another entity or element, such as a program, a database, or any other component, device, element, or object capable of initiating an exchange.

Electronic device 110 is synonymous with apparatus and it is inclusive of devices such as an endpoint, user equipment, a handheld device of any kind, a receiver, a computer, a desktop computer, a laptop computer, electronic notebook, an Internet appliance, a set-top box, an Internet radio device (IRD), a cellular telephone, an IP telephone, a smartphone, a tablet, a personal digital assistant (PDA), a game console, a mobile Internet device, a Google Android™, an iPhone™, and iPad™, a Microsoft Surface™, a remote control, a peripheral device, or any other device, component, element, or object capable of executing instructions or data exchanges.

Electronic device 110 can include a memory space 115 and a hardware sensor 170. Memory space 115 may be used to store programs (sequences of instructions) or data (e.g., program state information) on a temporary or permanent basis for use in a computer or other digital electronic device. Memory space 115 may be used to store data and/or instructions, for example within software; memory space 115 can be any suitable memory, such as non-volatile memory, flash memory, etc. and may include any suitable non-volatile storage device(s), such as one or more hard disc drives (HDDs). In a specific example, memory space 115 may be a process memory space. Hardware sensor 170 may be a sensor that responds to user input. A "user" can include any person, entity, software, or device capable of operating, using, or otherwise interfacing with electronic device 110. In one example, hardware sensor 170 may be a sensor or converter that measures a physical quantity and converts the measurement into a signal, which can be read by electronic device 110. In a specific example, hardware sensor 170 may be a biosensor (e.g., biometric sensor), chemical sensor, or keypad.

Memory space 115 can include an enclave 180 and an authentication application 190. Authentication application 190 may be an application or process that can access data from enclave 180 and hardware sensor 170 to determine whether someone or something is, in fact, who or what it is declared to be. Enclave 180 may be a TEE or a protected region of memory that is only accessible by enclave 180 itself or through a trusted services application program interface and other processes cannot read, write, or otherwise access the data stored in enclave 180.

Enclave 180 can include a trusted services application program interface (API) 140, one or more algorithms 150, reference data 160, and a key 165. Trusted service API 140 may be an API that specifies how processes or components in enclave 180 interact with processes, or components outside of enclave 180. For example, trusted service API 140 can specify how authentication application 190 interacts with one or more algorithms 150, reference data 160, and an authentication signing key 165 in enclave 180. One or more algorithms 150 can include one or more algorithms that allow for the authentication of a user and one or more algorithms that can create assertions or claims based on the authentication. Reference data 160 can include data that is used by trusted services API 140 to analyze input from hardware sensor 170 to verify the authenticity of the input.

In general terms, enclave 180, attestation server 130, and authentication server 120 are network elements inclusive of any type of nodes, gateways, routers, processor cores, server blades, service elements, as well as any devices, hosts, or servers (that are synonymous with 'apparatuses') that can facilitate the network communication activities discussed herein. As used herein in this Specification, the term 'network element' is a broad term meant to encompass routers, switches, cable boxes, gateways, bridges, loadbalancers, cellular and WiMAX access concentrators, firewalls, administrator boxes, inline service nodes, proxies, servers, processors, modules, or any other suitable device, component, element, proprietary appliance, or object operable to exchange information in a network environment. These network elements may include any suitable hardware, software, components, modules, interfaces, or objects that facilitate the operations thereof. This may be inclusive of appropriate algorithms, communication protocols, and interfaces that allow for the effective exchange of data or information.

Electronic device 110 can be configured for locally executing sensitive code from a cloud service using enclave 180 in a secured trusted environment. Enclave 180 and electronic device 110 may be authenticated by attestation server 130. An application, such as authentication application 190, can be executed in enclave 180 and the results from the application may be stored in enclave 180 or the results (or at least a portion of the results) may be encrypted and exported to be stored in unprotected memory separate from enclave 180. The results can be sent to authentication server 120 along with authentication signing key 165.

Enclave 180 is disclosed in FIG. 1 as being located in memory space 115, but it should be noted that other configurations are possible such that enclave 180 may be located in another memory space in electronic device or in a memory space that is separate or can be separated from electronic device 110 such as on a thumb drive or periphery of electronic device 110. Further, in general terms, the entities disclosed in this specification may or may not be separate entities depending on the specific configuration.

Figure 2:
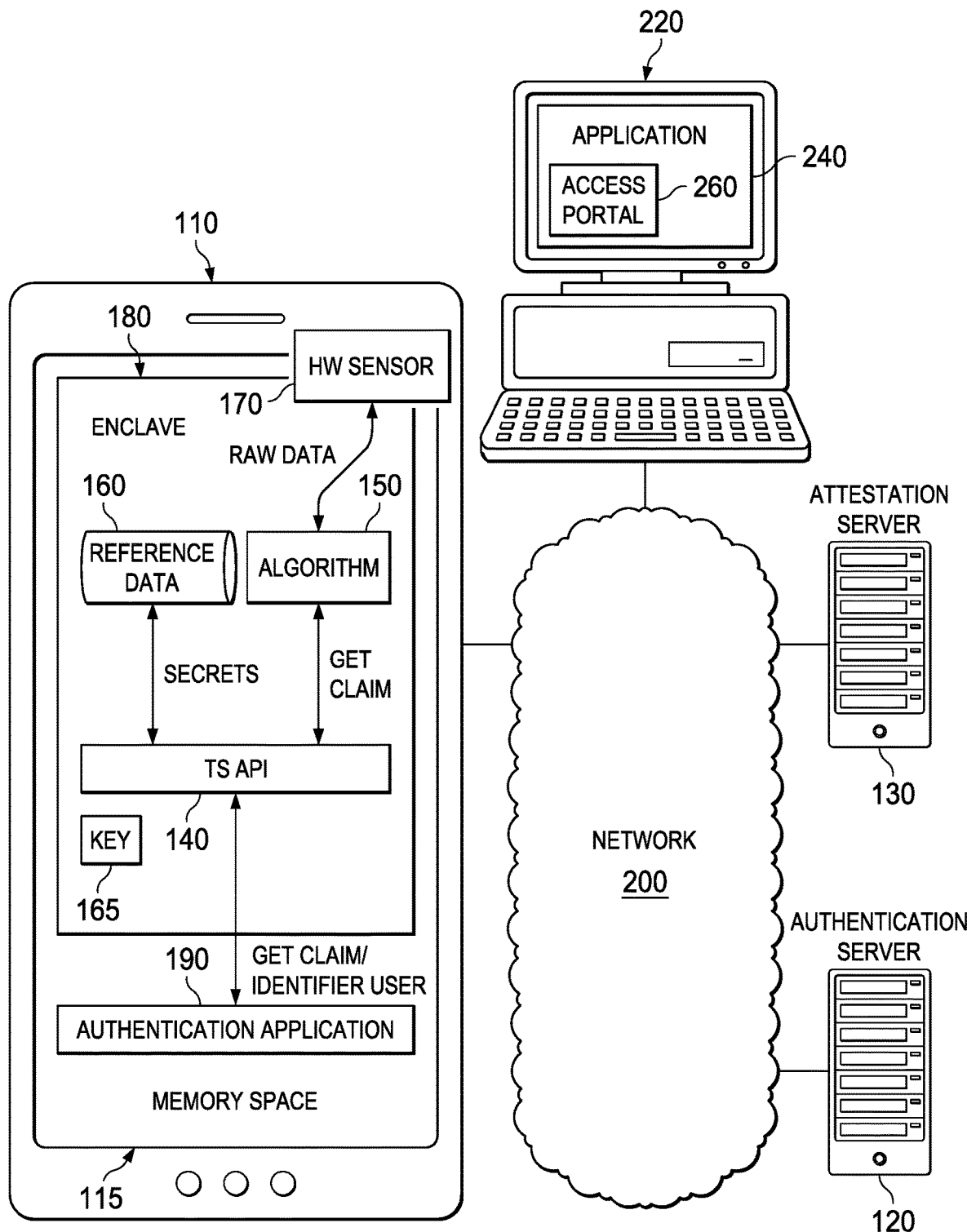
FIG. 2 is a block diagram of an environment for trusted execution of an executable object on an electronic device according to one or more examples of the present specification.

FIG. 2 is a block diagram of an embodiment of an environment for trusted execution of an executable object on a local device according to one or more examples of the present specification. The environment can include electronic device 110, authentication server 120, attestation server 130, and untrusted electronic device 220. Electronic device 110, authentication server 120, attestation server 130, and untrusted electronic device 220 may communicate through network 200. Untrusted electronic device 220 can include a secure application 240 and an access portal 260. Secure application may be a secure application, program, webpage, etc. that a user wishes to access. Access portal 260 can be used by electronic device 110 to access secure application 240. For example, secure application 240 may be an online test that a user needs to take for a class. Access portal 260 may be a quick response Code™ (QR Code™) that can be scanned by electronic device 110. Using enclave 180 and authentication application 190, the identity of the user can be recognized or verified and access to secure application 240 can be granted for the user.

Figure 3:
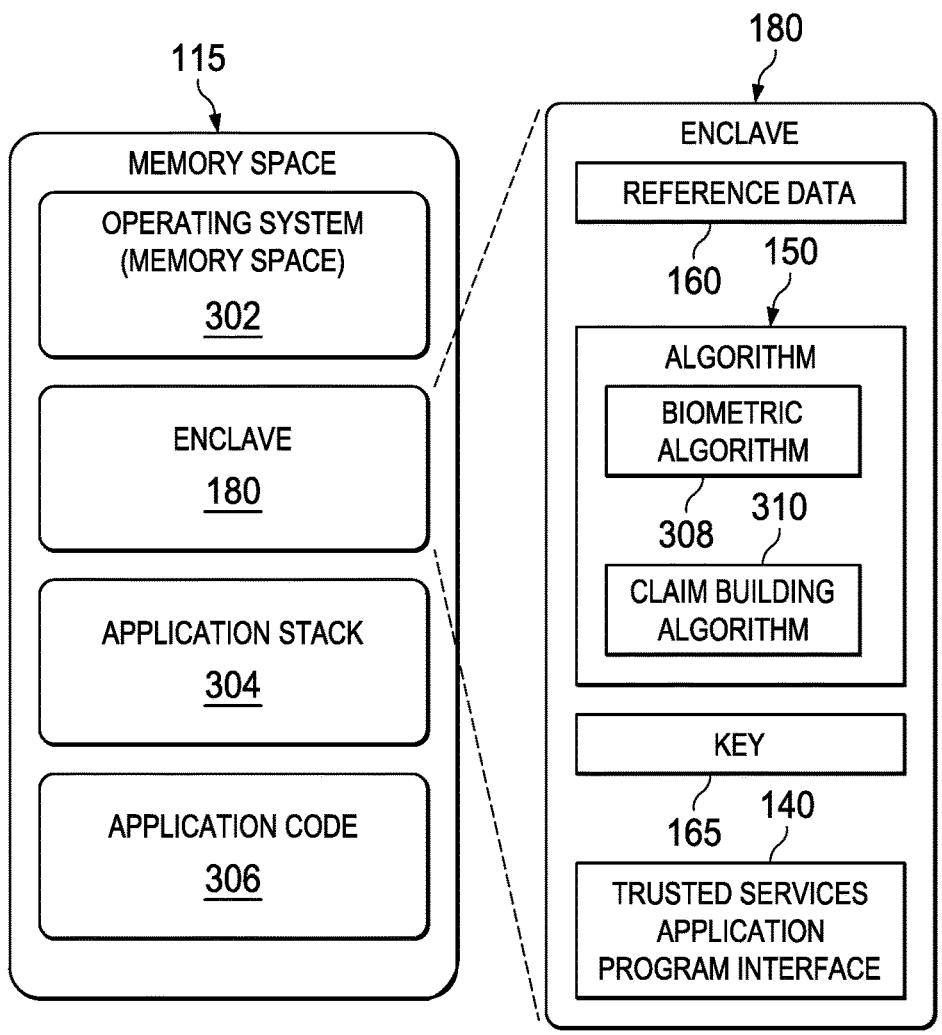
FIG. 3 is a block diagram of a memory space according to one or more examples of the present specification.

FIG. 3 is a block diagram of memory space 115 according to one or more examples of the present specification. Memory space 115 can include an OS memory space 302, enclave 180, an application stack memory space 304, and an application code memory space 306. Enclave 180 can include reference data 160, one or more algorithms 150, authentication signing key 165, and trusted services API 140. One or more algorithms 150 can include a biometric algorithm 308 and a claim building algorithm 310. One or more algorithms 150 can also include other algorithms or different algorithms that may be used by electronic device 110.

Biometric algorithm 308 can be used when comparing data obtained from hardware sensor 170 to data in reference data 160 in order to identify a user or determine authentication. Claim building algorithm 310 can be used to generate an assertion data or claim about the identity of the user. The assertion can include the results of the biometric algorithm as well as data about electronic device 110. The assertion also includes authentication signing key 165 and may be encrypted.

Figure 4:
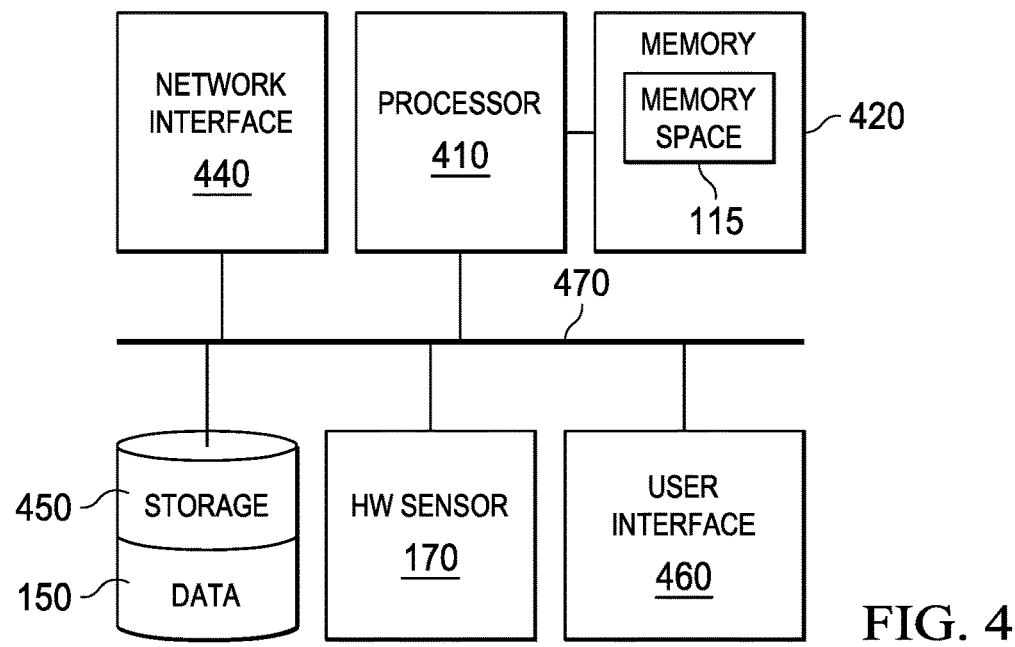
FIG. 4 is a block diagram of an electronic device 110 according to one or more examples of the present specification.

FIG. 4 is a block diagram of an electronic device (e.g., electronic device 110) or client device according to one or more examples of the present specification. The electronic device is controlled by a processor 410, which is communicatively coupled to a memory element 420. In an example, processor 410 is communicatively coupled to other system elements via bus 470. Those elements may include, by way of non-limiting example, a network interface 440, and storage 450, which in some cases may be a species of memory element 420, hardware sensor 170, and a user interface 460. It is expressly intended that any of the above elements can be realized in hardware, software, firmware, or any combination thereof.

Processor 410 is configured to control the electronic device, for example via executable software or firmware instructions. A "processor" can include any combination of hardware, software, or firmware providing programmable logic, including by way of non-limiting example a microprocessor, digital signal processor, field-programmable gate array, programmable logic array, application-specific integrated circuit, or virtual machine processor.

Memory 420 may be a relatively low-latency volatile memory in some embodiments, and may include main memory, cache, on-chip memory, L1 memory, L2 memory, or similar. Note that in this embodiment, processor 410 is depicted in a direct memory access arrangement with memory 420, but in other embodiment, memory 420 may communicate with processor 410 via system bus 470, via some other bus, or via some other means. Furthermore, although memory 420 and storage 450 are depicted in this example as physically or conceptually separate devices, it should be appreciated that in some embodiments, memory 420 and storage 450 may share a physical device, which may or may not be divided into separate memory area. Thus, it should be appreciated that the arrangement disclosed here is an example only, and not limiting. Rather, it is expressly intended that even where a memory and storage are spoken of separately, they may be embodied in a single physical or logical device unless expressly stated otherwise.

In this example, network interface 440 includes any communication medium, whether analog, digital, or mixed-signal, that is configured to communicatively couple the electronic device to other computing devices. Network interface 440 may include, by way of non-limiting example, a WiFi, ethernet, Firewire, fiberoptic, USB, serial interface, infrared, cellular network, digital PCS networks, 2G data network, 3G data network, 4G WiMAX, or 4G LTE data networks.

In some embodiments, user interface 460 may be provided to aid a user in interacting with electronic device 110. The term "user interface" can include any combination of hardware, software, and firmware configured to enable a user to interact with the electronic device, whether or not in real-time. In the example, user interface 460 may include, by way of non-limiting example, a keyboard, mouse, display monitor, speaker, microphone, touch-sensitive display, which may act as a combined input/output device, and a camera. User interface 460 may include software services such as a graphical user interface, including real-time dialog boxes that solicit input or confirmation from a user.

Storage 450 is disclosed as an example of a non-volatile memory medium, which may be a species of memory 420. In some embodiments, memory 420 and storage 450 may be separate devices, with memory 420 being a relatively low-latency volatile memory device, and storage 450 being a relatively high-latency non-volatile memory device. Storage 450 may also be another device, such as a hard drive, solid-state drive, external storage, redundant array of independent disks (RAID), network-attached storage, optical storage, tape drive, backup system, or any combination of the foregoing. Many other configurations are also possible, and are intended to be encompassed within the broad scope of this specification. In an example, memory 420 includes memory space 115 and may also include executable objects in a state of execution. Storage 450 may also include executable objects, which may be in a dormant or static state.

Figure 5:
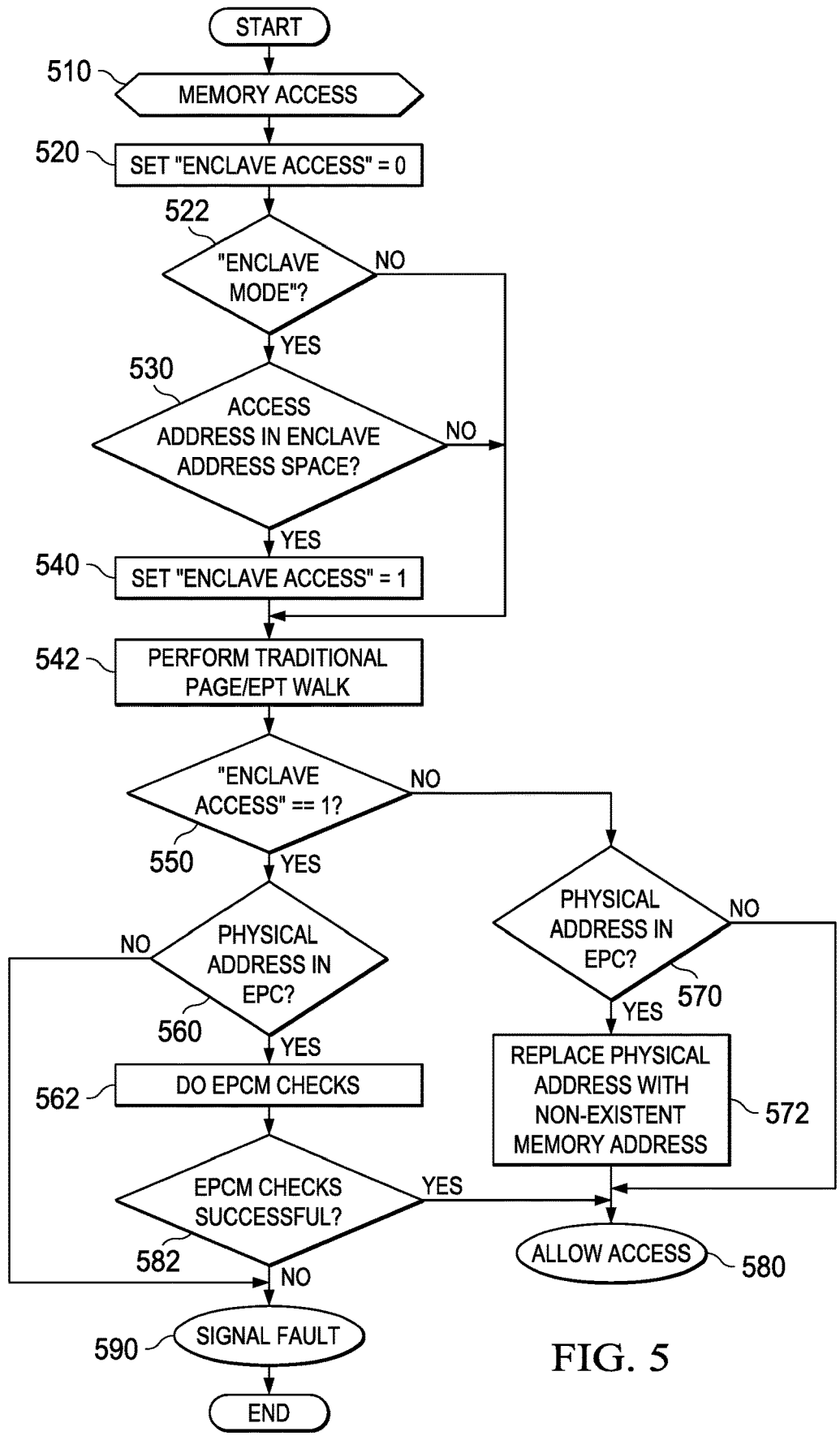
FIG. 5 is a flow diagram of an example process for accessing an enclave carried out according to one or more examples of the present specification.

FIG. 5 is a flow diagram 500 of an example process carried out by electronic device 110 for accessing an enclave according to one or more examples of the present specification. Many other combinations can occur to those having skill in the art, and it is intended that they be encompassed within the broad scope of this specification. It should further be noted that the steps or processes of the method of FIG. 5, and other methods in this specification, are disclosed in a particular order by way of example only, and that the order of the steps taken may be arbitrarily rearranged except where explicitly stated otherwise, or where the context of the disclosure makes it unambiguously clear that one step follows another step. Furthermore, in a case where one step expressly or necessarily follows another, it is not intended to imply that the second step directly or immediately occurs after the first step, that intervening steps occur, or that the second step be a direct, immediate, uninterrupted result of the first step, or that the second step cannot occur but for the first step.

In this example, in block 510, memory is accessed to enable or otherwise access an application or data. In block 520, enclave access (a variable) is set to zero. In block 522, the system determines if an enclave mode is enabled or set. In an embodiment, when a processor enters into an enclave, the system begins to run in enclave mode. This mode changes the memory access semantics to perform additional checks on memory accesses and allows the code inside the enclave to access that particular enclave. Otherwise, memory accesses to the enclave can result in the return of an abort page value. If the enclave mode is not enabled, then a traditional page/extended page table (EPT) walk may be performed, as in block 542. If the enclave mode is enabled, then the system determines if an access addresses for the application or data is in the enclave address space, as in block 530. If the access addresses for the application or data is not in the enclave address space, then a traditional page/EPT walk may be performed, as in block 542. If the access addresses for the application or data is in the enclave address space, then enclave access is set to one, as in block 540. In block 542, a traditional page/EPT walk may be performed.

In block 550, the system determines if the enclave access is set to one. If the enclave access is not set to one, then the system determines if the physical address of the application or data is in an enclave page cache (EPC), as in block 570. If the physical address in not in the EPC, then access to the application or data is allowed, as in block 580. If the physical address is in the EPC, then the physical address is replaced with a non-existent memory address, as in block 572, and access to the application or data is allowed, as in block 580.

Referring back to block 550, if the system determines that the enclave access is set to one, then the system determines if the physical address is in the EPC, as in block 560. If the physical address is not in the EPC, then a signal fault error is issued, as in 590. If the physical address is in the EPC, then they system does an enclave page cache map (EPCM) check, as in block 562. The system determines if the EPCM check was successful, as in block 582. If the EPCM check was successful, then access to the application or data is allowed, as in block 580. If the EPCM check was not successful, then a signal fault error is issued, as in 590.

Figure 6:
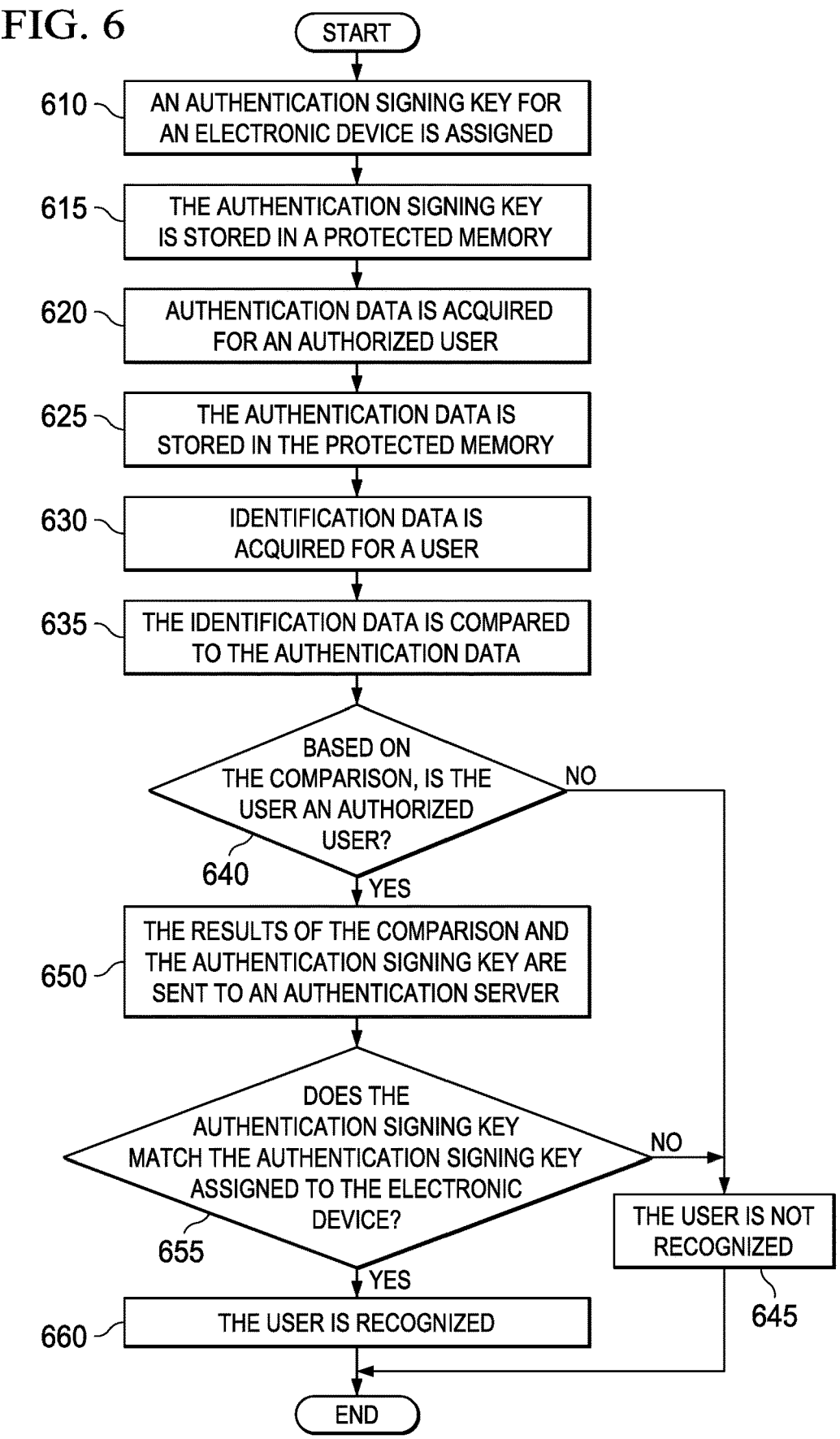
FIG. 6 is a flow diagram of an example process for trusted execution on an electronic device carried out according to one or more examples of the present specification.

FIG. 6 is a flow diagram of a method for trusted execution on an electronic device (i.e., a local device) according to one or more examples of the present specification. According to the example, in block 610, an authentication signing key for an electronic device is assigned. For example, the authentication signing key may be assigned to electronic device 110 by attestation server 130. In block 615, the authentication signing key is stored in a protected memory (e.g., enclave 180). In block 620, authentication data is acquired for an authorized user. In block 625, the authentication data is stored in the protected memory. In block 630, identification data is acquired for a user. For example, the identification data for a user wanting to access the system may be acquired using hardware sensor 170. In one particular example, the identification data is biometric data.

In block 635, the identification data is compared to the authentication data. For example, authentication application 190 may use trusted services API 140 to access biometric algorithm 308 and compare the identification data to the authentication data. It should be appreciated that many algorithms are possible for comparing the identification data to the authentication data, and the scope of this specification, including the appended claims, is not intended to be limited to any specific algorithm unless expressly stated.

In block 640, based on the comparison, the system determines if the user is an authorized or recognized user. If the user is not an authorized user, then the user is deemed as not recognized, as in block 645, and access to the system is not allowed. If the user is an authorized user, then the results of the comparison and the authentication signing key are sent to an authentication server, as in block 650. In block 655, the system determines if the authentication signing key matches the authentication signing key assigned to the electronic device. If the authentication signing key does not match the authentication signing key assigned to the electronic device, then the user is deemed as not recognized, as in block 645. If the authentication signing key matches the authentication signing key assigned to the electronic device, then the user is considered as being recognized, as in block 660 and access to the system is allowed. In an example, the determination of whether the user is an authorized user (block 640) may be performed at the authentication server.

Figure 7:
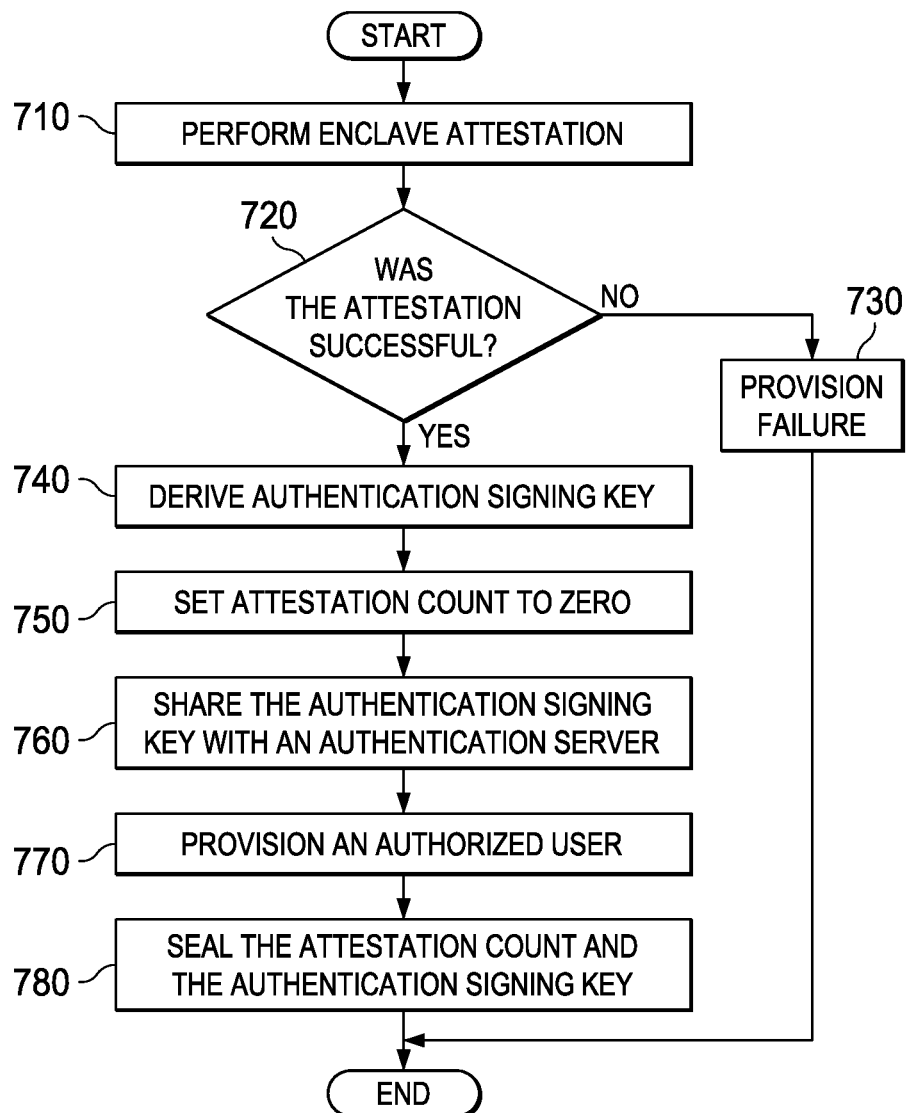
FIG. 7 is a flow diagram of an example process for attestation of an electronic device carried out according to one or more examples of the present specification.

FIG. 7 is a flow diagram of a method of attestation of an electronic device according to one or more examples of the present specification. According to the example, in block 710 an enclave attestation is performed. This determines if electronic device 110 has an enclave or TEE capability. In block 720, the system determines if the attestation was successful. If the attestation was not successful, then a provision failure error occurs, as in block 730. If the attestation was successful, then an authentication signing key is derived, as in block 740. In block 750, attestation count (a variable) is set to zero. The attestation count is used to control the number of times an authentication signing key is used. By only allowing an authentication signing key to be used a certain number of times, damage can be mitigated if the authentication signing key was being used maliciously or captured by malware. In block 760, the authentication signing key is shared with an authentication server. In block 770, an authorized user is provisioned. Provisioning an authorized user can include obtaining authentication data for the user. In block 780, the attestation count and the signing key are sealed. In an example, the attestation count and the authentication signing key can be sealed by storing them in enclave 180.

Figure 8:
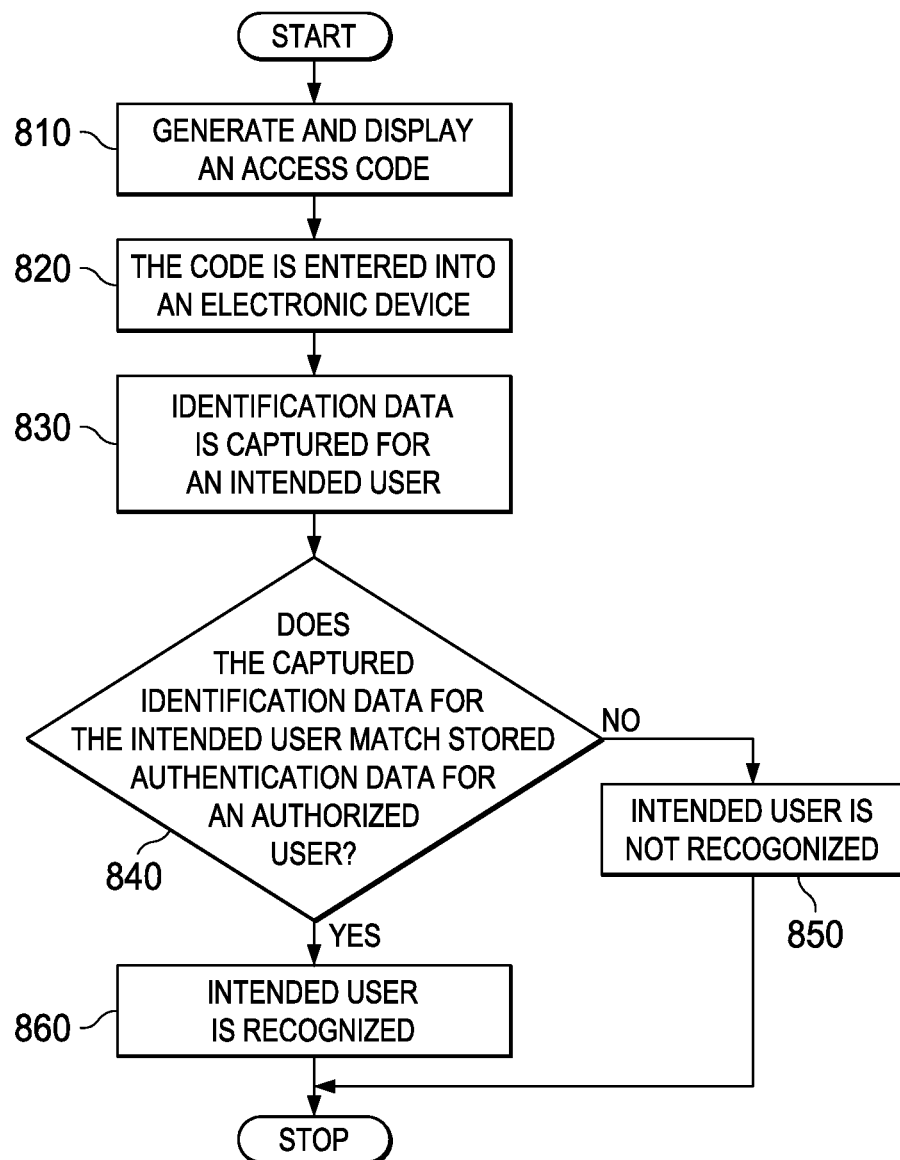
FIG. 8 is a flow diagram of an example process for accessing an electronic device or an application on an electronic device carried out according to one or more examples of the present specification.

FIG. 8 is a flow diagram of a method of accessing an electronic device or an application on an electronic device according to one or more examples of the present specification. According to the example, in block 810 and access code is generated and displayed on an electronic device. The access code may be a QR Code, a bar code, or some other type of code that can be recognized by an electronic device (e.g., electronic device 110). In block 820, the code is entered into the electronic device. For example, the code may be scanned by electronic device 110 or manually entered into electronic device 110. In block 830, identification data is captured for an intended user. For example, hardware sensor 170 may be used to capture biometric identification data such as a fingerprint from an intended user. In block 840, the electronic device determines if the captured identification data for the intended user matches stored authentication data for an authorized user. If the captured identification data does not match, then the intended user is not recognized (and therefore not allowed to access the electronic device or the application), as in block 850. If the captured identification data matches, then the intended user is recognized (and may be allowed to access the electronic device or the application), as in block 860.

Figure 9:
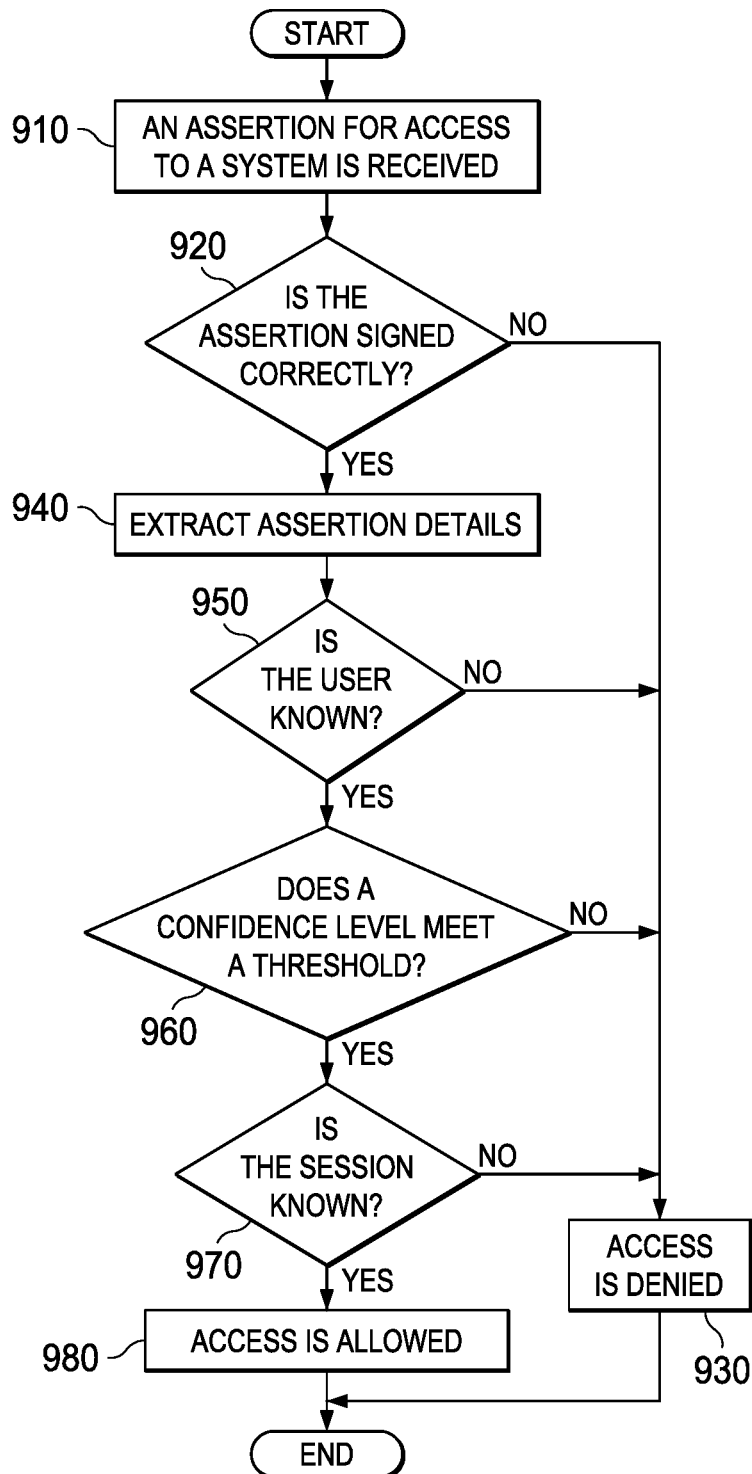
FIG. 9 is a flow diagram of an example process for processing an assertion carried out according to one or more examples of the present specification.

FIG. 9 is a flow diagram of a method of processing an assertion or claim according to one or more examples of the present specification. According to the example, in block 910, an assertion for access to a system is received. For example, authentication server 120 may have received an assertion or claim that includes an authentication signing key from electronic device 110. In block 920, the system determines if the assertion is signed correctly. If the assertion is not signed correctly, then access (for the user) is denied or the user is not recognized, as in block 930. If the assertion is signed correctly, then assertion details are extracted, as in block 940. The assertion details can include a confidence level that was created using claim building algorithm 310 and the results from biometric algorithm 308 when identification data for an intended user was compared to authentication data for an authorized user. In block 950, the system determines if the user is known. If the user is not known, then access is denied to the user, as in block 930.

If the user is known, then the system determines if the confidence level meets a threshold, as in block 960. For example, the assertion details may contain the results from a comparison of identification data to authentication data. The results may be expressed as a percentage match, (e.g., a 95% match was found between the identification data and the authentication data, and the system may determine if the 95% is above a threshold, such as 90%). If the confidence level does not meet the threshold, then access (for the user) is denied, as in block 930. If the confidence level meets the threshold, then the system determines if the session is known, as in block 970. For example, the session may be secure application 240 as referenced in FIG. 2. If the session is not known, then access (for the user) is denied, as in block 930. If the session is known, then access (for the use) is allowed and the user is recognized, as in block 916.

Figure 10:
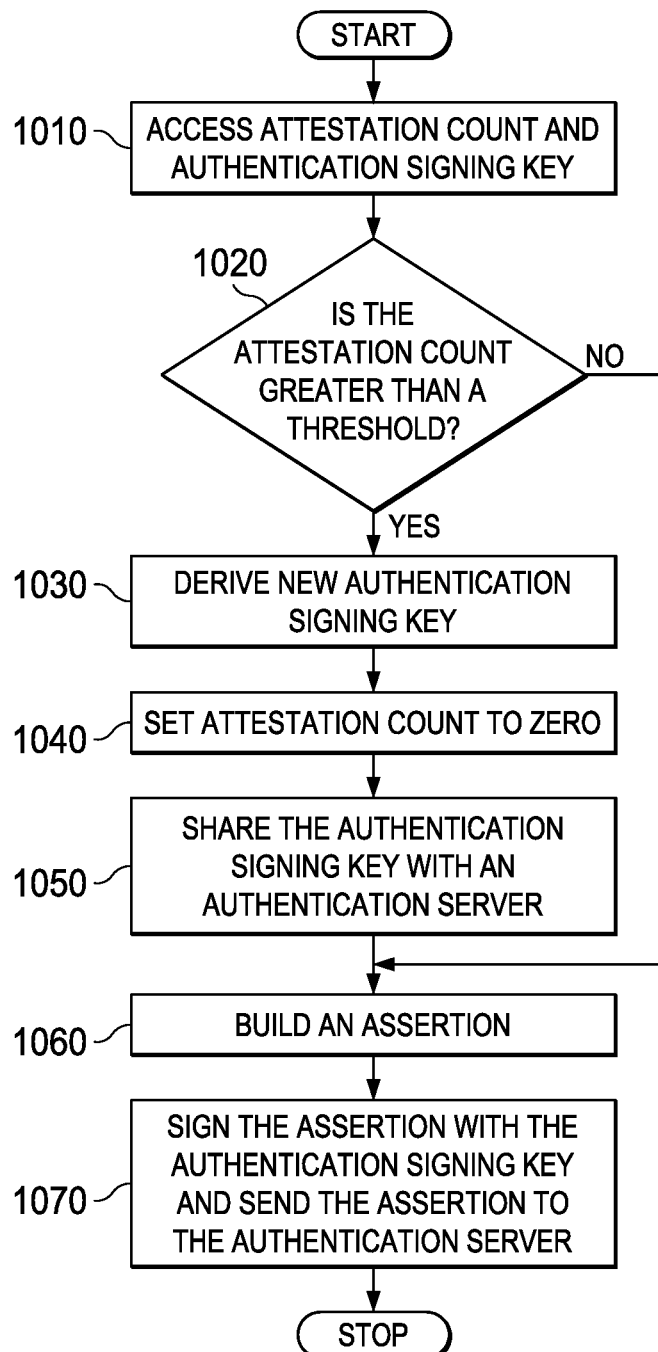
FIG. 10 is a flow diagram of an example process for processing an assertion carried out according to one or more examples of the present specification.

FIG. 10 is a flow diagram of a method for processing an assertion or claim according to one or more examples of the present specification. According to the example, in block 1010, an attestation count and an authentication signing key are accessed. In block 1020, the system determines if the attestation count is greater than a threshold. If the attestation count is not greater than the threshold, then an assertion is built, as in block 1060. If the attestation count is greater than the threshold, then a new authentication signing key is derived, as in block 1030. The new authentication signing key may be requested from attestation server 130. By only allowing an authentication signing key to be used a certain number of times, damage can be mitigated if the authentication signing key was being used maliciously or captured by malware. In block 1012, the attestation count is set to zero. In block 1050, the new authentication signing key is shared with an authentication server. In block 1060, an assertion is built. The assertion can include a confidence level that was created using claim building algorithm 310 and the results from biometric algorithm 308 when identification data for an intended user was compared to authentication data for an authorized user. In block 1070, the assertion is signed with the authentication signing key and the assertion is sent to the authentication server. For example, authentication application 190 may use trusted services API 140 to access claim building algorithm 310 to build and sign the assertion or claim with authentication signing key 165. It should be appreciated that many algorithms are possible for building and signing the assertion, and the scope of this specification, including the appended claims, is not intended to be limited to any specific algorithm unless expressly stated.

Figure 11:
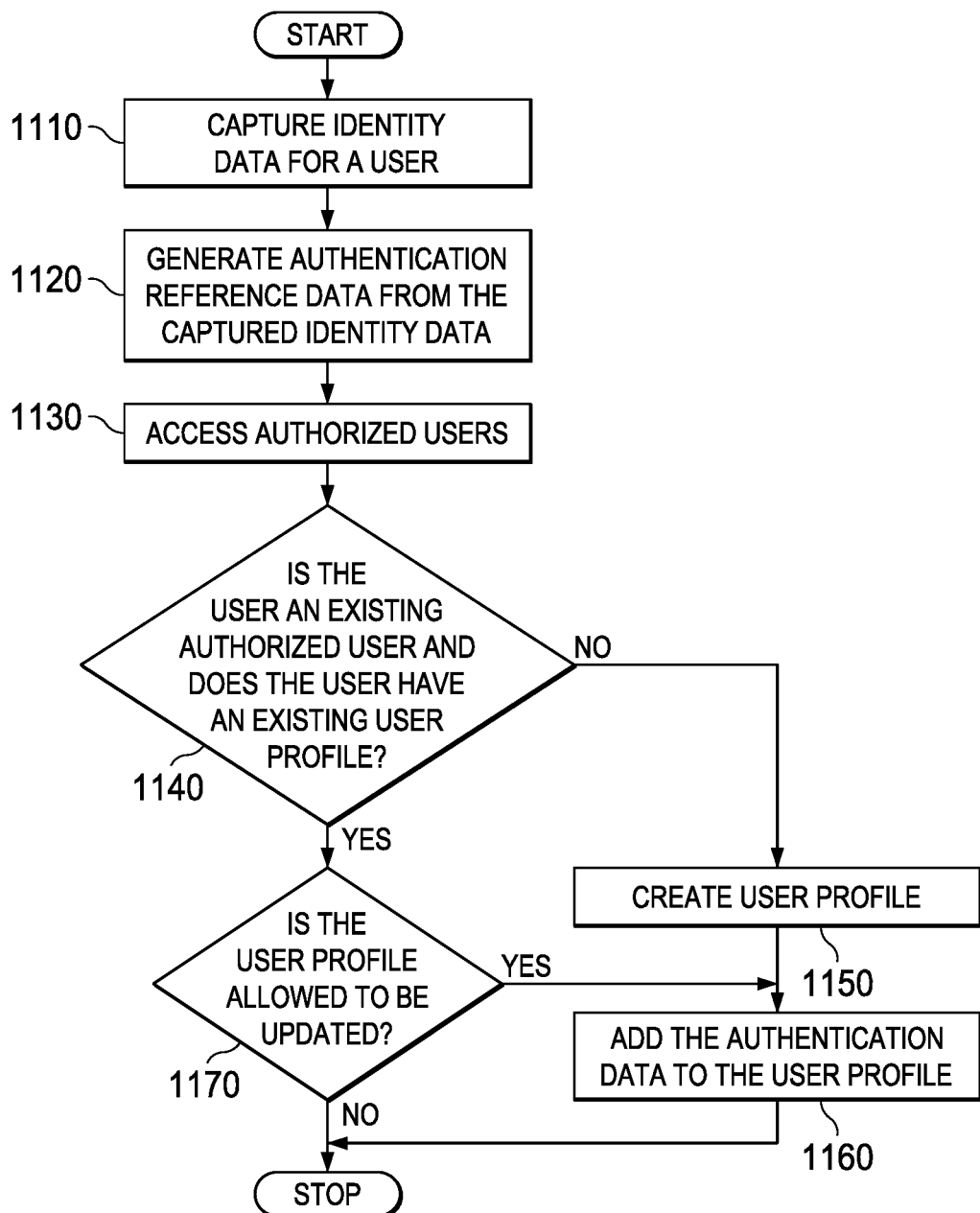
FIG. 11 is a flow diagram of an example process for creating an authorized user carried out according to one or more examples of the present specification.

FIG. 11 is a flow diagram of a method of creating an authorized user according to one or more examples of the present specification. According to the example, in block 1110, identity data for a user is captured. In block 1120, authentication data is generated from the captured identity data. In block 1130, a list of authorized users is accessed. In block 1140, the system determines if the user is an existing authorized user and has an existing user profile. If the user is not an existing authorized user, then a user profile is created, as in block 1150 and the authentication data is added to the user profile, as in block 1160.

If the user is an existing authorized user, then the system determines if the user profile is allowed to be updated, as in block 1170. If the user profile is not allowed to be updated, then the process stops and an error message may be sent or some type of notice that the user is already registered and that the user profile cannot be updated. If the user profile is allowed to be updated, then the authentication data is added to the user profile, as in block 1160.

In example implementations, at least some portions of the processing activities (e.g., involving local processing, cloud processing, enclaves, etc.) outlined herein may also be implemented in software. This could include instances of the modules of FIG. 3 or FIG. 4 being provisioned in any suitable location (e.g., in a server, in a router, in a firewall, in an electronic device, etc.). In some embodiments, one or more of these features may be implemented in hardware in the aforementioned devices, or provided externally to the elements of the disclosed figures, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described herein should be construed as being encompassed within the broad term 'microprocessor' or 'processor.'

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, Python, Perl, JavaScript, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In one example, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Example Embodiment Implementations

By way of non-limiting example, there is disclosed herein as example 1 a device configured to acquire authentication data for an authorized user and to store the authentication data in an enclave, acquire identification data for a potential user, and compare, in the enclave, the identification data to the authentication data. There is also disclosed as example 2, the example of 1, where the device is further configured to obtain an authentication signing key from an attestation server and store the authentication signing key in the enclave, where the authentication signing key verifies the identity of the enclave. There is also disclosed as example 3, the example of 2, where the device is further configured to send the results of the comparison and the authentication signing key to an authentication server.

There is also disclosed as example 4, the example of 1, where the results of the comparison are encrypted. There is also disclosed as example 5, the example of 1, where the results of the comparison are encrypted and stored in an untrusted memory that is separate from the enclave. There is disclosed as example 6, the example of 1, where the identification data is biometric data. There is disclosed as example 7, the example of 1, where the identification data is acquired outside of the enclave and a trusted services application program interface is used to bring the identification data into the enclave. There is disclosed as example 8, the example of 1, where the device is further configured to access a secure application based on the results of the comparison. There is disclosed as example 9, the example of 1, where the enclave is a trusted execution environment. There is disclosed as example 10, the example of 1, where the enclave is a protected region of memory that is accessible through a trusted services application program interface.

There is disclosed as example 11, the example of 1, where the identification data is acquired by a hardware sensor. There is disclosed as example 12, a server configured to receive an assertion from a device, where the assertion includes an authentication signing key and results from a comparison of acquired data and reference data and determine if the assertion is valid by comparing the results to a threshold and the authentication signing key to an authentication signing key assigned to the device. There is disclosed as example 13, the example of 12, where the assertion determines if a user trying to access the device is an authorized user.

There is disclosed as example 14, the example of 12, where the authentication signing key was obtained from an attestation server. There is disclosed as example 15, the example 12, where the device is further configured to allow access to the device if the assertion is valid. There is disclosed as example 16, the example of 12, where the assertion is encrypted. There is disclosed as example 17, the example of 12, where the acquired data and the reference data are biometric data. There is disclosed as example 18, at least one computer readable storage medium comprising instructions that, when executed, cause an apparatus to acquire authentication data for an authorized user and store the authentication data in an enclave, acquire identification data for a potential user, and compare, in the enclave, the identification data to the authentication data.

There is disclosed as example 19, the computer-readable storage medium of example 18, further comprising instructions that, when executed, cause an apparatus to obtain an authentication signing key from an attestation server and store the authentication signing key in the enclave, where the authentication signing key verifies the identity of the enclave. There is disclosed as example 20, the computer-readable storage medium of example 19, further comprising instructions that, when executed, cause an apparatus to send the results of the comparison and the authentication signing key to an authentication server. There is disclosed as example 21, the computer-readable storage medium of example 18, where the results of the comparison are encrypted and stored in an untrusted memory that is separate from the enclave.

There is disclosed as example 22, the computer-readable storage medium of example 18, where the identification data is biometric data. There is disclosed as example 23, the computer-readable storage medium of example 18, where the identification data is acquired outside of the enclave and a trusted services application program interface is used to bring the identification data into the enclave. There is disclosed as example 24, the computer-readable storage medium of example 18, further comprising instructions that, when executed, cause an apparatus to access a secure application based on the results of the comparison. There is disclosed as example 25, the computer-readable storage medium of example 18, where the enclave is a trusted execution environment.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the specification, to limit this disclosure in any way that is not otherwise reflected in the appended claims.

What is claimed is:

1. An electronic client device, comprising:
an enclave;
at least one processor;
at least one memory;
at least one driver, wherein the electronic client device is configured to:
obtain an authentication signing key from an attestation server;
store the authentication signing key in the enclave, wherein the authentication signing key verifies the identity of the enclave;
acquire, after storing the authentication signing key, authentication data for an authorized user;
store the authentication data in the enclave;
acquire identification data for a potential user;
compare, by locally executing, with the processor, a biometric algorithm in the enclave, the identification data to the authentication data to determine if the potential user is the authorized user; and
send results of the comparison and the authentication signing key to an authentication server.

2. The electronic client device of claim 1, wherein the electronic client device is further configured to:
generate an assertion claim for the potential user using a claim building algorithm.

3. The electronic client device of claim 1, wherein the results of the comparison are encrypted.

4. The electronic client device of claim 1, wherein the results of the comparison are encrypted and stored in an untrusted memory that is separate from the enclave.

5. The electronic client device of claim 1, wherein the identification data is biometric data.

6. The electronic client device of claim 1, wherein the identification data is acquired outside of the enclave and a trusted services application program interface is used to bring the identification data into the enclave.

7. The electronic client device of claim 1, wherein the electronic client device is further configured to:
access a secure application based on the results of the comparison.

8. The electronic client device of claim 1, wherein the enclave operates in a trusted execution environment.

9. The electronic client device of claim 1, wherein the enclave is a protected region of memory that is accessible through a trusted services application program interface.

10. The electronic client device of claim 1, wherein the identification data is acquired by a hardware sensor.

11. One or more non-transitory computer readable medium having instructions stored thereon, the instructions, when executed by a processor, cause the processor to:
obtain an authentication signing key from an attestation server;
store the authentication signing key in the enclave, wherein the authentication signing key verifies the identity of the enclave;
acquire, after storing the authentication signing key, authentication data for an authorized user;
store the authentication data in an enclave on an electronic client device;
acquire identification data for a potential user; and
compare, by locally executing a biometric algorithm in the enclave, the identification data to the authentication data to determine if the potential user is the authorized user; and
send results of the comparison and the authentication signing key to an authentication server.

12. The medium of claim 11, further including instructions that, when executed by the processor, cause the processor to:
generate an assertion claim for the potential user using a claim building algorithm.

13. The medium of claim 11, wherein results of the comparison are encrypted and stored in an untrusted memory that is separate from the enclave.

14. The medium of claim 11, wherein the identification data is biometric data.

15. The medium of claim 11, wherein the identification data is acquired outside of the enclave and a trusted services application program interface is used to bring the identification data into the enclave.

16. The medium of claim 11, further including instructions that, when executed by the processor, cause the processor to:
access a secure application based on results of the comparison.

17. The medium of claim 11, wherein the enclave is a trusted execution environment.

* * * * *